Patented June 27, 1950

2,513,098

UNITED STATES PATENT OFFICE 2,513,098

TETRAAZAPORPHINE PIGMENTS CONTAINING STYRENE GROUPS, POLYMERS THEREOF, AND METHOD FOR THEIR PRODUCTION

Edward L. Kropa, Old Greenwich, and John J. Roemer, Stamford, Conn., assignors to American Cyanamid Company, New York, N. Y., a corporation of Maine No Drawing. Application August 3, 1948, Serial No. 42,338

5 Claims. (Cl. 260—88.3)

This invention relates to a new type of tetraazaporphine pigments and processes of preparing the same.

In the past a number of tetraazaporphine pigments have achieved great commercial importance. More particularly, the so-called phthalocyanines, of which copper pthalocyanine and its halogenated derivatives are of the greatest commercial interest. Pigments of the phthalocyanine type show excellent light fastness and other properties and because of the brilliant color many of the pigments have extended use in coating compositions and similar fields.

The present invention relates to a different series of tetraazaporphine pigments in which the molecule may be very large by reason of polymerization. Essentially, the phthalocyanine pigments known hitherto may be considered as formed by the condensation of four molecules of phthalonitrile forming a great ring of alternate carbon and nitrogen atoms containing eight of each. As phthalonitrile contains only two reactive groups and these are all exhausted in forming the great tetraazaporphine ring, monomeric substances have been produced, that is to say, each molecule of the pigment contained only a single tetraazaporphine ring. In contrast to the monomeric phthalocyanines of the past, the tetraazaporphine pigments of the present invention exist in either monomeric or polymeric form. In fact, the polymeric form is almost always present in the mixture which results when the process of the present invention is carried out.

The pigments of the present invention are produced by condensing an orthodichlorostyrene in which the chlorine atoms are ortho to each other with a cyanide of copper preferably cuprous cyanide and preferably in a suitable organic liquid. Throughout the specification and claims the term "ortho-dichlorostyrene" will be used in the above more narrow sense to include only compounds in which the chlorine atoms are ortho to each other; a compound in which the chlorine atoms are each ortho to the vinyl group is not included within the scope of the expression. Theoretically, ortho-dichlorostyrene is capable of reacting with cuprous cyanide in the proportion of four molecules of dichlorostyrene to eight molecules of cuprous cyanide to form a monomeric tetraazaporphine pigment. However, the conditions of reaction which require heating and especially the purification procedures which involve acid pasting in concentrated sulfuric acid are conditions which favor the polymerization of dichlorostyrene and as a result the pigments of the present invention are produced in the form of mixtures which contain a high content of polymerized material. In the case of the product produced from 3,4-dichlorostyrene the formula for the polymerized material is as follows:

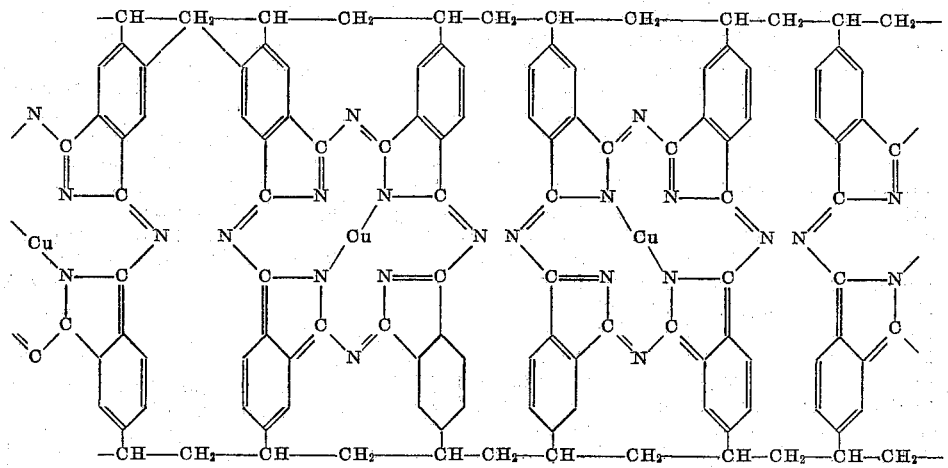

When the pigment of the present invention is subjected to purification by acid pasting in concentrated sulfuric acid it will be noted that it is only partially soluble in the acid. The soluble portion is unquestionably the monomer and possibly a very low polymer whereas the insoluble portion is all polymerized material.

While the new products of the present invention are of course not restricted to any particular method of preparation the processes used are in general similar to those employed in producing copper phthalocyanine from phthalonitrile except of course that cuprous cyanide takes the place of a cuprous halide such as cuprous chloride. The reaction is effected in an organic liquid preferably a heterocyclic base such as pyridine or quinoline. However, other suitable organic liquids such as mononitrobenzene and alphachloronaphthalene may be used. A small amount of a halogen catalyst is desirable although not essential. Typical catalysts are iodine, cupric chloride or cuprous bromide.

It is an advantage of the invention that it is not necessary to use pure organic liquids as the reaction media since organic liquids of technical quality give substantially the same results. Particularly, in the case of heterocyclic bases such as pyridine and quinoline, the technical products are preferred as they represent a real economy.

The time of heating is not critical and will vary with the reactants and catalysts used. There is, of course, an optimum time at each temperature but a useful product is obtainable over a wide range of time. In general, longer heating results in the formation of more of the polymeric product and less of the monomer or in the extreme case of very long heating times no monomer may be formed at all. Temperature also is not sharply critical but should be in the range from about 200–260° C. for best results.

The reaction used in preparing the pigments of the present invention is in marked contrast to the behavior of other mononuclear orthodichloro products. For example, it has been attempted in the past to produce copper phthalocyanine by reacting ortho-dichloro-benzene with cuprous cyanide. This, however, failed to produce any useful amount of pigment and is in marked contrast to the readiness with which the dichlorostyrene reacts under optimum conditions in the present invention. The reason the process of the present invention operates at all when ortho-dichlorobenzene will not react to produce any useful result is not completely known. In the case of monomeric pigment formation it is possible that the unsaturated sidechain on the styrene exerts some effect. However, as it seems probable that polymerization takes place even in producing a pigment with a single tetraazaporphine ring, it seems more likely that the three carbon bridge between the benzene rings has some influence on the reaction. This seems a more likely explanation because a similar methane bridge exerts the same activating effect on di-chlorophenyl radicals. In that case pigments are prepared from tetrachlorodiphenylmethanes and tetrachlorodiphenyl methyl methanes, good yields being obtained in contrast to the failure of orthodichlorobenzene which was tried in the past. While it is not desired to limit the present invention to any particular theory of action I do feel that the effect of an aliphatic bridge between the aromatic rings is probably an important factor and may perhaps be the only reason why the pigments of the present invention are produced.

The invention will be described in greater detail in conjunction with the following specific examples. Parts are by weight.

*Example 1*

52 parts of ortho-dichlorostyrene, 65 parts of cuprous cyanide, and 30 parts of pyridine were heated at 210° C. for about 21 hours and the temperature then raised to 250° C. for three hours. A greenish-brown pigment was obtained which on acid pasting with concentrated sulfuric acid showed only partial solubility and is, therefore, considered to contain a large portion of polymerized product.

*Example 2*

The process of Example 1 was carried out substituting an equivalent amount of technical quinoline for the pyridine, the same pigment resulted.

*Example 3*

The process of Example 1 was followed but a corresponding amount of alphachloronaphthalene was substituted for the pyridine. The reaction proceeded smoothly and the same greenish-brown pigment resulted.

We claim:

1. Tetraazaporphine pigments selected from the group consisting of a pigment having the following formula:

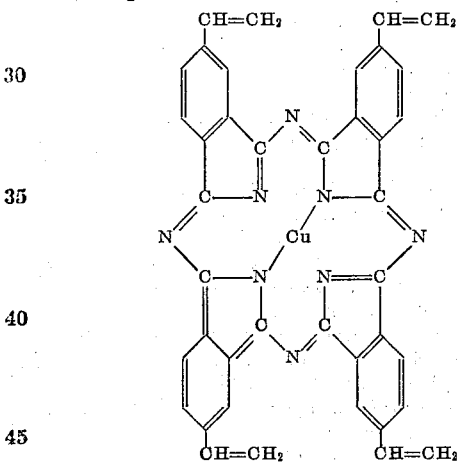

and its polymers.

2. A process of preparing a tetraazaporphine pigment which comprises heating cuprous cyanide and ortho-dichlorostyrene in an organic liquid at temperatures between 200–260° C.

3. A process according to claim 2 in which the organic liquid is pyridine.

4. A process according to claim 3 in which the liquid is quinoline.

5. A process according to claim 2 in which the liquid is ortho-chloronaphthalene.

EDWARD L. KROPA.
JOHN J. ROEMER.

REFERENCES CITED

The following references are of record in the file of this patent:

FOREIGN PATENTS

| Number | Country | Date |
|---|---|---|
| 490,744 | Great Britain | Aug. 22, 1938 |
| 205,538 | Switzerland | Dec. 16, 1939 |